(12) United States Patent
Feng et al.

(10) Patent No.: US 7,646,167 B2
(45) Date of Patent: Jan. 12, 2010

(54) SYSTEM FOR UPDATING PROGRAMMABLE BATTERIES

(75) Inventors: Li Yao Feng, Shenzhen (CN); Zeng Jin Hui, Shenzhen (CN); Wang Jun, Shenzhen (CN)

(73) Assignee: Technuity, Inc., Indianapolis, IN (US)

( * ) Notice: Subject to any disclaimer, the term of this patent is extended or adjusted under 35 U.S.C. 154(b) by 317 days.

(21) Appl. No.: 11/411,284

(22) Filed: Apr. 26, 2006

(65) Prior Publication Data

US 2007/0252554 A1    Nov. 1, 2007

(51) Int. Cl.
*H01M 10/46* (2006.01)

(52) U.S. Cl. ...................................... 320/112

(58) Field of Classification Search ............... 320/106, 320/107, 112; 702/63, 64, 65
See application file for complete search history.

(56) References Cited

U.S. PATENT DOCUMENTS

| | | | |
|---|---|---|---|
| 4,845,419 A * | 7/1989 | Hacker ................... 320/136 |
| 5,459,671 A * | 10/1995 | Duley ..................... 702/63 |
| 5,563,496 A * | 10/1996 | McClure ................. 320/128 |
| 5,633,573 A * | 5/1997 | van Phuoc et al. ....... 320/128 |
| 5,646,508 A * | 7/1997 | van Phuoc et al. ....... 320/152 |
| 5,789,899 A * | 8/1998 | van Phuoc et al. ....... 320/112 |
| 2005/0017686 A1 * | 1/2005 | Sakakibara et al. ...... 320/132 |

* cited by examiner

*Primary Examiner*—Edward Tso
(74) *Attorney, Agent, or Firm*—Krieg DeVault LLP (57) ABSTRACT

A system for updating battery software includes a programmable battery unit that includes an internal access point. The programmable battery unit includes a battery control unit that controls the overall functionality of the programmable battery unit. A programmable storage medium may be included on the battery control unit. The storage medium has stored therein battery software operable to control certain features of the programmable battery unit. An input port may be connected with the battery control unit. An update device that includes a second storage medium having stored therein updated battery software for the programmable battery unit. A connector may be included for connecting the update device to the input port of the programmable battery unit. A software routine on the update device is operable to automatically transfer the updated battery software from the update device to the first storage medium of the programmable battery unit thereby reprogramming the programmable battery unit.

14 Claims, 7 Drawing Sheets

SYSTEM FOR UPDATING PROGRAMMABLE BATTERIES

BACKGROUND

1. Technical Field

The present invention relates broadly to batteries, and more particularly to a battery update system used to update software in programmable battery units that may be used in various types of electronic devices.

2. Related Art

Almost all portable electronic devices use rechargeable batteries to power the devices so that they are portable. These batteries are very complex and often include software that is typically stored in a memory device located on a printed circuit board inside the battery. The software may be used to monitor and control charging of the battery as well as certain functionality when the battery is connected to a respective electronic device. For example, the software located on the battery may communicate with the electronic device to allow the electronic device to know how much charge is remaining on the battery. The charge level indication may then be communicated to a user of the electronic device through a display of the electronic device in the form of a charge bar or a minutes remaining indication.

Various manufacturers of electronic devices that use these batteries make improvements to these electronic devices each year or come out with new electronic devices each year that may use the same type of battery. However, the software of existing batteries may not be compatible with the new electronic devices. As such, battery manufacturers need to reprogram the batteries to be compatible with new devices. Currently, the batteries are reprogrammed by shipping the batteries back from the store in which they may be located to the manufacturer where they are disassembled and new printed circuit boards are placed in the batteries with updated software. As readily apparent, the costs associated with shipping these batteries back to the manufacturer and replacing existing printed circuit boards with new printed circuit boards having updated software is extremely expensive.

As such, a need exists for a portable handheld update device and batteries that are designed to be quickly and easily reprogrammed in the field without requiring the need to ship the batteries back to the manufacturer for disassembly.

SUMMARY

A battery update system is disclosed that is capable of updating software located in rechargeable programmable battery units that are designed to be compatible with numerous types of electronic devices. The battery update system may include a portable handheld electronic update device that may be taken by a technician to a particular location that has several batteries that need reprogrammed. The programmable battery units may include a reprogramming access point that allows the technician to connect the battery update device with the programmable battery unit. Once a connection between the two respective devices has been established, the battery update device may automatically begin to transfer updated battery software to the programmable batter unit. After reprogramming is complete, the technician may disconnect the battery update device from the programmable battery unit and move on to anther programmable battery unit.

The access point may be located at a specified location on a housing of the programmable battery unit. The access point may be used to expose an input/output port that may be associated with a battery control unit. The battery control unit may be a microprocessor, a programmed chip such as an EEPROM, or a specially designed electronic circuit. The electronic components of the programmable battery unit are typically placed on a printed circuit board located inside the housing of the programmable battery control unit. The programmable battery unit may also include a sliding door that is used to open and close the access point. As such, the sliding door may be designed to expose and cover the input/output port responsible for receiving the updated battery software.

The battery update device may be a specially designed portable handheld electronic device that is powered by a rechargeable battery. In other embodiments of the present invention, the battery update device may comprise portable computing device such as a laptop, a pocket PC or the like. Update software stored on the update device is designed to detect a valid connection between a programmable battery unit and the update device and then transfer updated battery software to the programmable battery unit once a valid connection has been established. The combination of an update device and a programmable battery unit eliminates the requirement of transporting the programmable battery units back to the manufacturer to be reprogrammed as new electronic devices enter the market that require software that is different from that which is already located on the programmable battery unit.

Other systems, methods, features and advantages of the invention will be, or will become apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts throughout the different views.

DETAILED DESCRIPTION OF THE PRESENTLY PREFERRED EMBODIMENTS

Figure 1:
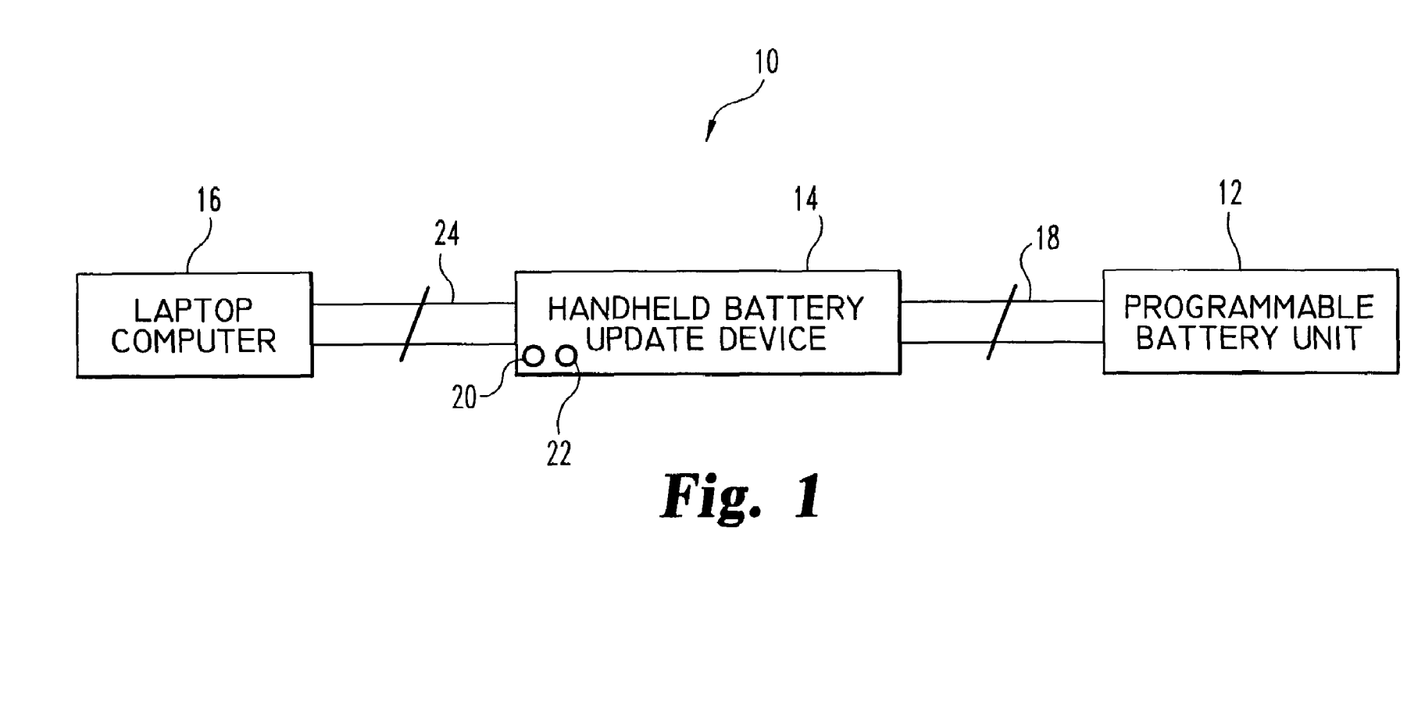
FIG. 1 illustrates a battery update system.
Figure 2:
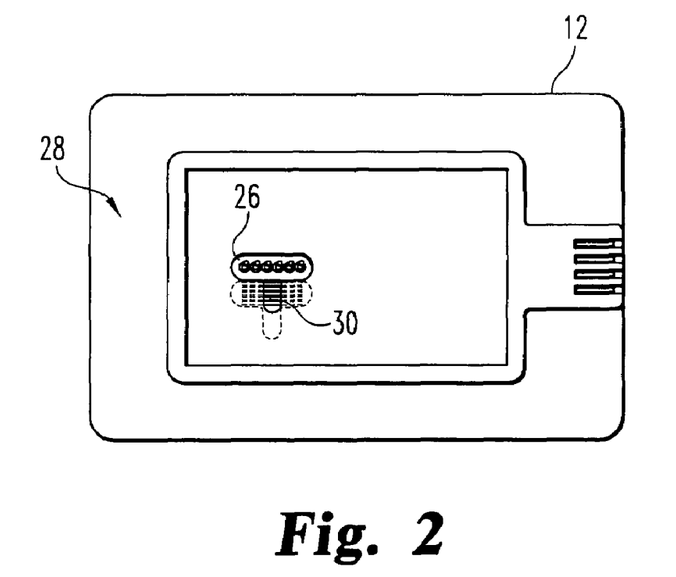
FIG. 2 illustrates a programmable battery unit of the battery update system.

Referring to FIG. 1, a battery update system 10 is illustrated that is capable of allowing a technician to quickly and easily update software located within a programmable battery unit 12 in the field or at a specific retail location. The battery update system 10 may include a handheld portable update device 14 that may be temporarily connected with the programmable battery unit 12. As set forth in greater detail below, the handheld portable update device 14 may also be temporarily connected with a computing device 16 for updating the software stored in the portable handheld update device 14.

During operation, a technician will use the portable handheld update device 14 to update software located on the programmable battery unit 12. The portable handheld update device 14 may include a cable 18 that allows the portable handheld update device 14 to be temporarily connected with the programmable battery unit 12. Once the portable handheld update device 14 is connected with the programmable battery unit 12, updated battery software stored on the portable handheld update device 14 may be automatically transferred to the programmable battery unit 12. The portable handheld update device 14 may also include a first indicator 20 and a second indicator 22. The first and second indicators 20, 22 may be any type of device that is capable of providing the technician with proper notice that the portable handheld update device 14 is in the process of updating the software of the programmable battery unit 12 and that the update process is complete. For example, the first and second indicators 20, 22 may comprise red and green light emitting diodes ("LEDs"). In other embodiments, a display of a computing device may be used to give an indication in a graphical user interface ("GUI") format.

As set forth above, once the portable handheld update device 14 is connected with the programmable battery unit 12, via cable 18, software located in the portable handheld update device 14 may automatically begin transferring updated battery software to the programmable battery unit 12. Once a proper connection is established, the first indicator 20 may be energized to notify the technician that a proper connection has been established and that a software update is in progress. As soon as the software update is complete, the first indicator 20 may be de-energized and the second indicator 22 may be energized to notify the technician that the update process is complete. For example, the green LED may be energized once a proper connection has been established and while the software update is in progress and then the red LED may be energized to indicate that the software update process is complete.

The portable handheld update device 14 may also be temporarily connected with a computing device 16 via a second cable 24. The computing device 16 may comprise a personal computer or laptop but could also comprise a portable handheld computing device and so forth. Different types of programmable battery units 12 may have different software update needs or requirements thereby requiring different versions of battery software to be transferred to the portable handheld update device 14 to accommodate this need. For example, software for a camcorder programmable battery unit designed for a camcorder manufactured by one entity may be completely different from the software needed for a second camcorder programmable battery unit for a camcorder manufactured by an entirely different manufacturer.

Referring to FIGS. 2-5, the update process will be described in more detail. In this embodiment of the present invention, the programmable battery unit 12 may include an access point 26 that allows the cable 18 of the portable handheld update device 14 to be connected with the programmable battery unit 12. The access point 26 may comprise an aperture located at a predetermined location of a battery housing 28. As set forth in greater detail below, the access point 26 allows electronic communication to be conducted between the portable handheld update device 14 and the programmable battery unit 12.

Figure 3:
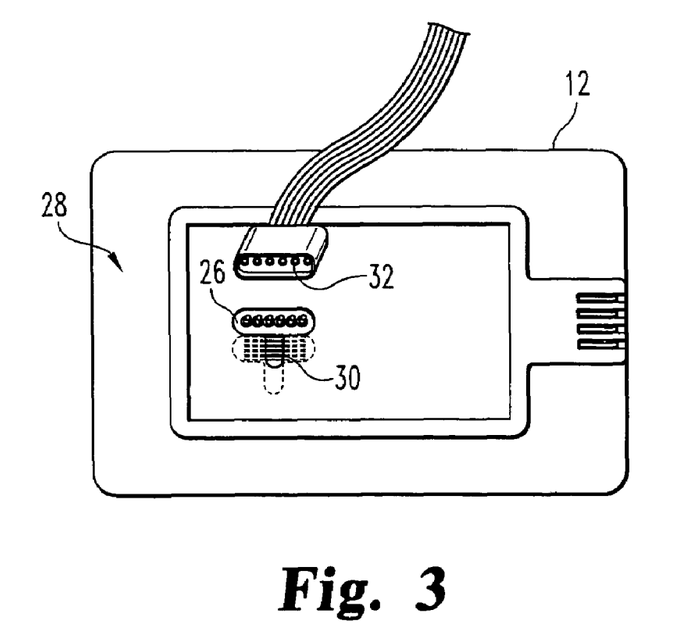
FIG. 3 illustrates a connector of an update device being connected with the programmable battery unit.

A sliding door 30 may also be included on the programmable battery unit 12 that is operable to allow the technician to open and close the access point 26. Once the sliding door 30 is slid back to open the access point 26, a connector 32 of the cable 18 may be inserted into the access point 26 as illustrated in FIG. 3. Although not clearly illustrated in FIG. 3, the programmable battery unit 12 may include an input port that the connector 32 is connected with during the battery software update process.

Figure 4:
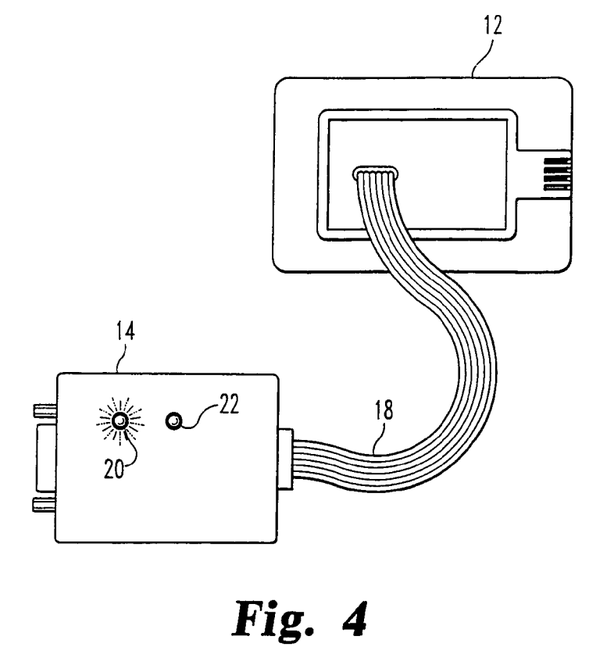
FIG. 4 illustrates a programmable battery unit being reprogrammed by the update device.
Figure 5:
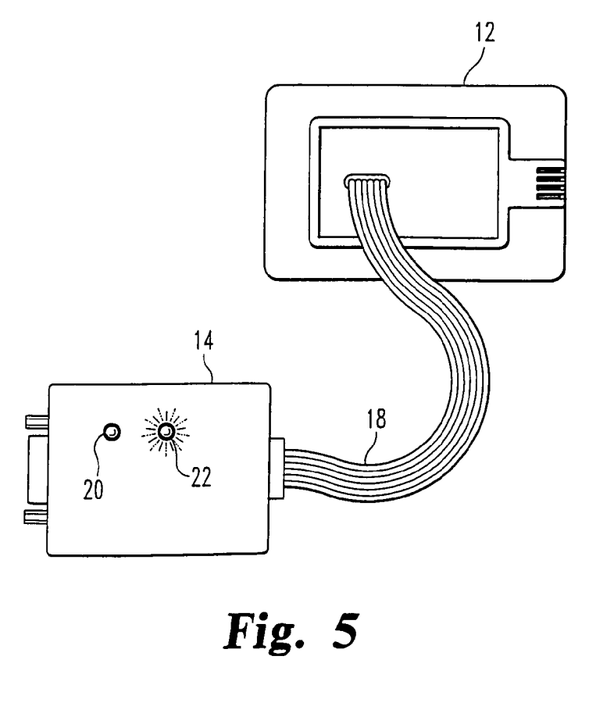
FIG. 5 illustrates the end of the updating process.

As illustrated in FIG. 4, the portable handheld update device 14 may energize the first indicator 20 once a proper connection has been detected by the portable handheld update device 14. While the first indicator 20 is energized, the portable handheld update device 14 is in the process of updating the battery software of the programmable battery unit 12. Referring to FIG. 5, after the battery software has been successfully updated, the second indicator 22 may be energized on the portable handheld update device 14 to indicate to the technician that the battery update has been successfully completed.

Figure 6:
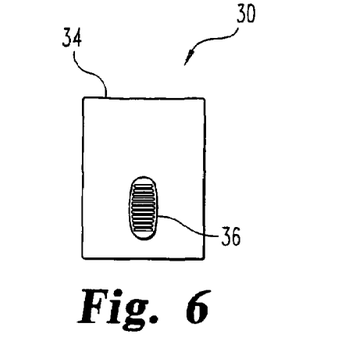
FIG. 6 illustrates a sliding door of the programmable battery unit.
Figure 7:
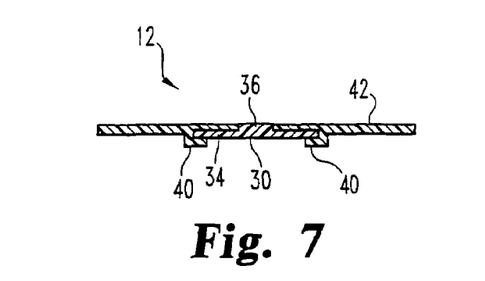
FIG. 7 is a cross-sectional view of a portion of the programmable battery unit housing the sliding door.

Referring to FIG. 6, the sliding door 30 of the programmable battery unit 12 may comprise a base 34 and an upwardly protruding grip 36. As illustrated in FIG. 7, the sliding door 30 may be placed within the programmable battery unit 12 such that it is operable to slide back and forth within a pair of support brackets 40 connected with or molded as part of a surface 42 of the battery housing 28. In order to open and close the aperture 26 in the programmable battery unit 12, the technician will use the upwardly protruding grip 36 to slide the sliding door 30 back and forth.

Figure 8:
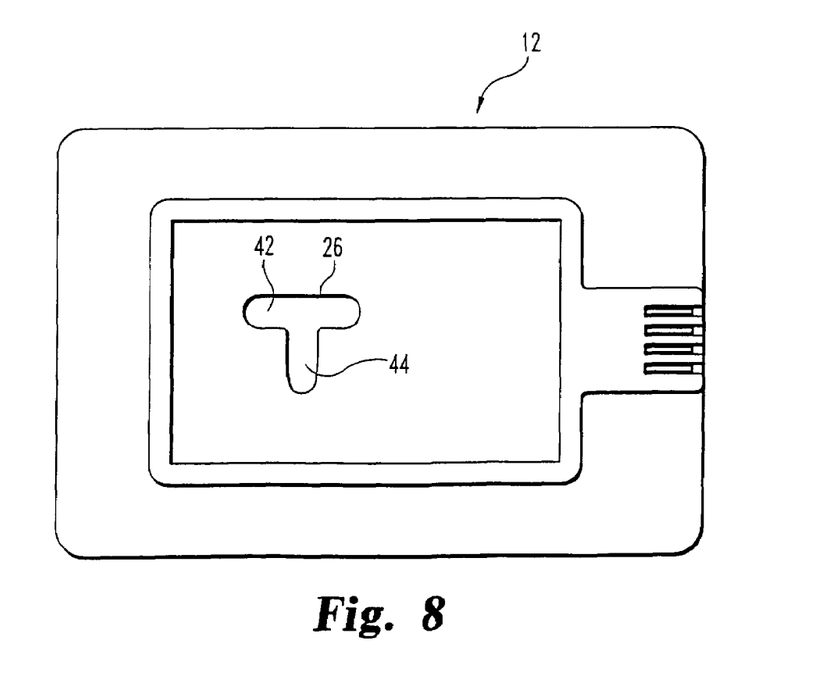
FIG. 8 is a top view of the programmable battery unit with the sliding door removed.

Referring to FIG. 8, the aperture 26 of the programmable battery unit 12 may include an input port aperture 42 and a grip aperture 44 that may run transverse of the input port aperture 42. The input port aperture 42 allows the connector 32 of the cable 18 of the portable handheld update device 14 to be inserted into an input/output ("I/O") port 46 (see FIG. 9) of the programmable battery unit 12. The grip aperture 42 and a portion of the input port aperture 42 allow access to the upwardly protruding grip 36 of the sliding door 30 as well as allow the upwardly protruding grip 36 to be moved back and forth to open and close the input port aperture 42.

Figure 9:
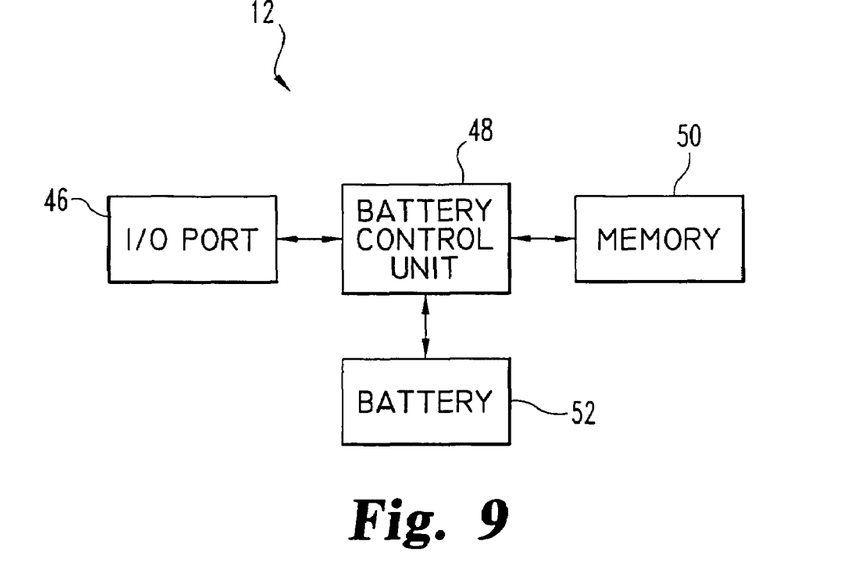
FIG. 9 is a block diagram depicting illustrative hardware components of the programmable battery unit.

Referring to FIG. 9, the programmable battery unit 12 may include a battery control unit 48, a memory storage medium 50, the I/O port 46 and at least one battery 52. The I/O port 46, the memory storage medium 50 and the battery 52 may be connected with the battery control unit 48. The I/O port 46 may be a serial port, parallel port, a Universal Serial Bus ("USB") port or any other type of port capable of transmitting and receiving data between respective devices. The I/O port 46 allows data to be transferred to and from the battery control unit 48 of the programmable battery unit 12.

The control unit 48 may comprise a microprocessor, a specially programmed control chip, such as an EEPROM, or an integrated circuit specifically designed for the programmable battery unit 12 for example. The memory storage medium 50 may comprise a non-volatile memory device such as an EPROM, EEPROM, flash EEPROM or the like. The memory storage medium 50 and the I/O part 46 may be built into the battery control unit 48 in some embodiments of the present invention. The battery 52 may comprise one of several different types of rechargeable batteries commonly used in the industry.

Figure 10:
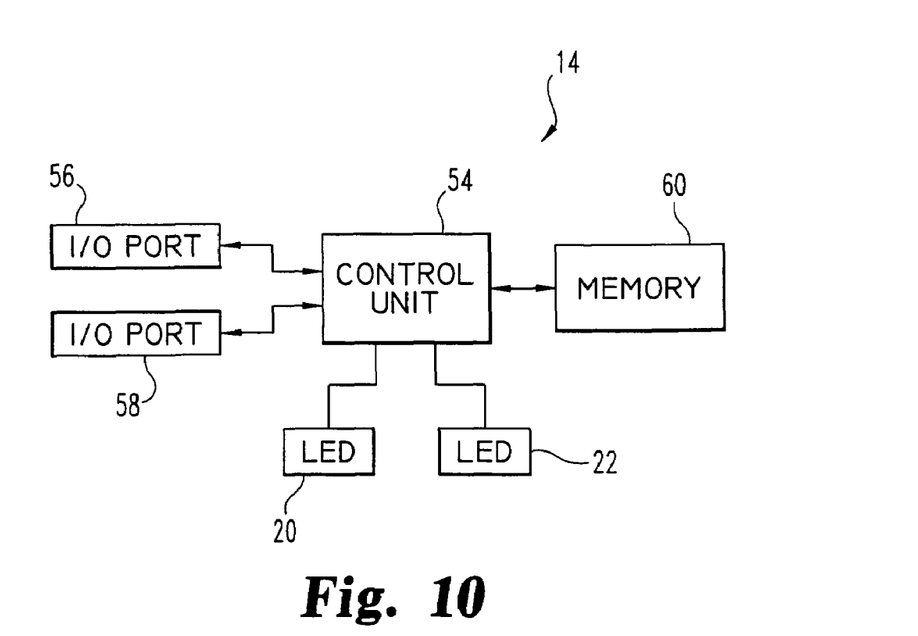
FIG. 10 is a block diagram depicting illustrative hardware components of the battery update device.

Referring to FIG. 10, the portable handheld update device 14 may include a control unit 54, a first I/O port 56, a second I/O port 58, a memory storage medium 50, the first indicator 20 and the second indicator 22. The first and second I/O ports 56, 58, the memory storage medium 60, and the first and second indicators 20, 22 may be connected with the control unit 54 or may be part of the control unit 54. The control unit 54 may comprise a microprocessor, a specially programmed control chip, such as an EEPROM, or an integrated circuit specifically designed for the control unit 54 for example.

The first I/O port 56 may be used to connect the portable handheld update device 14 with the computing device 16. The second I/O port 58 may be used to connect the portable handheld update device 14 with the programmable battery unit 12. The first and second I/O ports 56, 58 may comprise a serial port, parallel port, a Universal Serial Bus ("USB") port or any other type of port capable of transmitting and receiving data between respective devices. The first and second I/O ports 56, 58 allow data to be transferred to and from the control unit 54 of the portable handheld update device 14. The memory storage medium 60 may comprise a non-volatile memory device such as an EPROM, EEPROM, flash EEPROM or the like.

Figure 11:
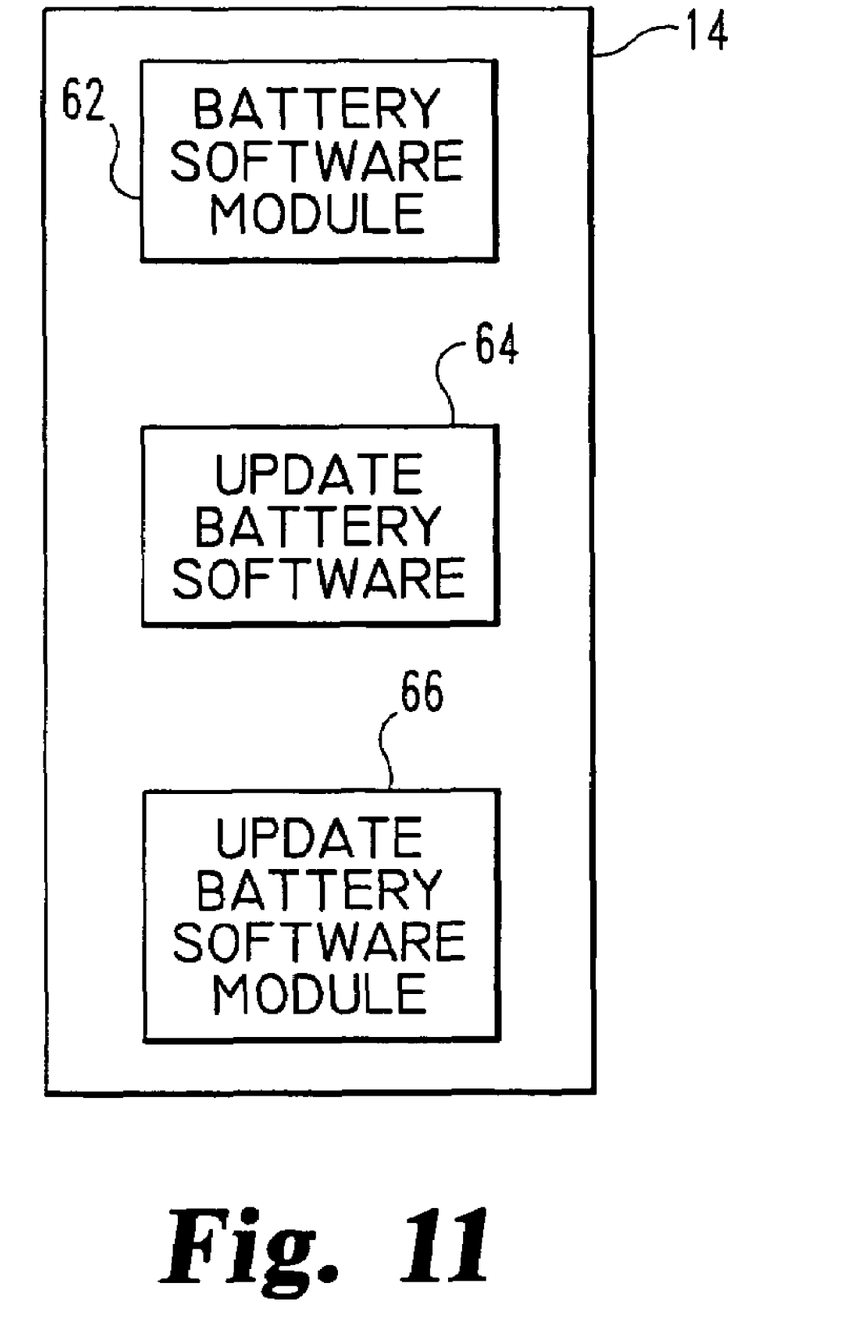
FIG. 11 illustrates software modules that may be stored in the battery update device.

Referring to FIG. 11, the portable handheld update device 14 may include a battery update module 62, updated battery software 64 and an update battery software module 64. The battery update module 62 may be operable to automatically cause the portable handheld update device 14 to begin updating software stored in the programmable battery unit 12 as soon as the portable handheld update device 14 detects a proper connection. The updated battery software 64 is the new software that is transferred or written to the programmable battery unit 12 during the update process by the update battery software module 62. The update battery software module 66 allows the updated battery software 64 stored in the portable handheld update device 14 to be updated to different versions of the battery software for different types of programmable battery units 12.

Figure 12:
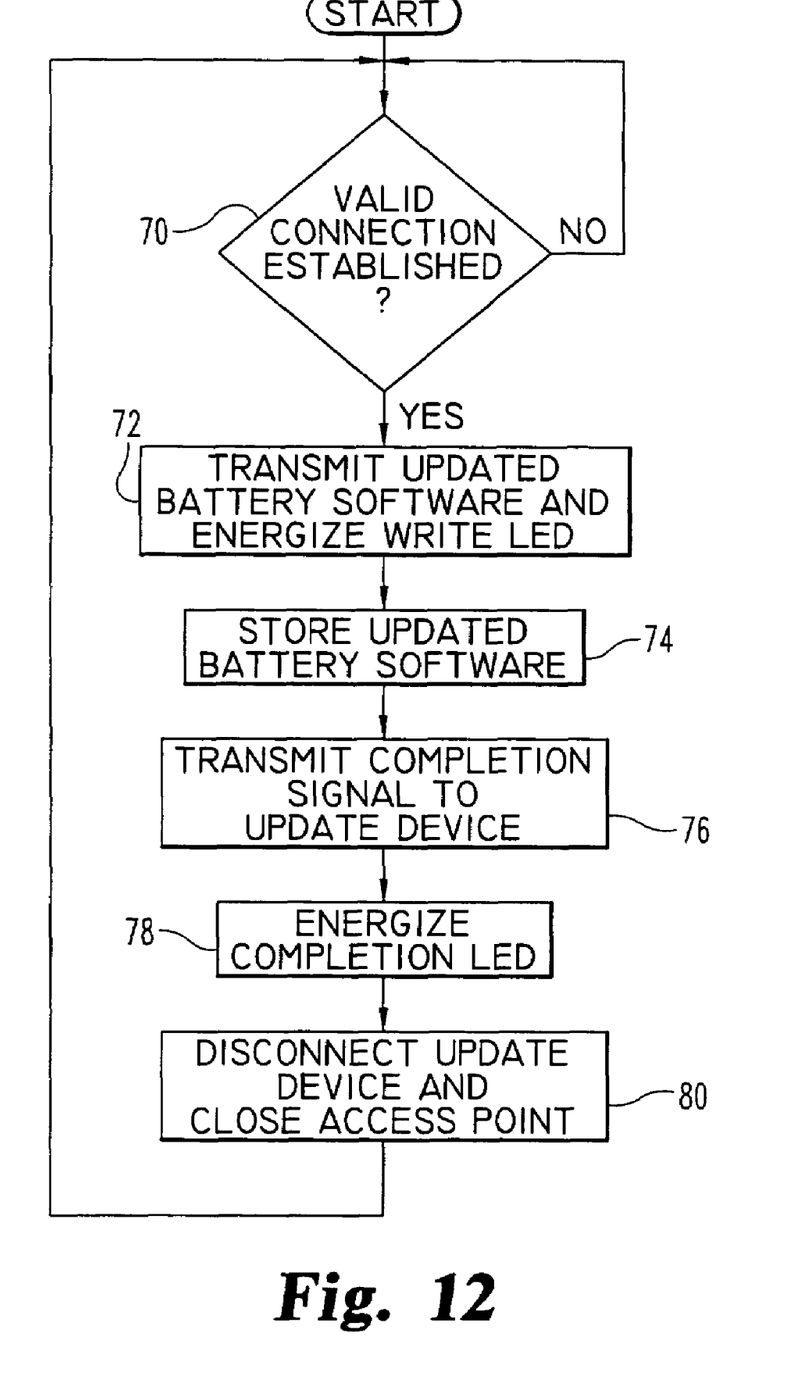
FIG. 12 is a block diagram illustrating the battery update procedure.

Referring to FIG. 12, a flow chart illustrating exemplary steps performed by the battery update module 62 is set forth. At step 70, the battery update module 62 continuously attempts to determine whether or not a valid connection has been established with a programmable battery unit 12. If a valid connection is established, at step 72 the battery update module 62 may automatically begin to transmit the updated battery software 64, via I/O port 58, to the programmable battery unit 12, which receives the updated battery software 64 via I/O part 46. In addition, the update device 14 may energize the first indicator 20 to show the technician that an update is in progress.

As set forth above, the battery control unit 48 receives the updated battery software 64 via I/O port 46 and stores it in the memory storage medium 50 of the programmable battery unit 12, which is illustrated at step 74. The updated battery software 64 overwrites the previous version of the battery software stored in the memory storage medium 50 thereby causing the programmable battery unit 12 to use the new software. Once transmission of the updated battery software 64 is complete, the battery control unit 48 of the programmable battery unit 12 may transmit a completion signal to the update device 14, which is indicated at step 76. At step 78, the update device 14 may energize the second indicator 22 to indicate to the technician that the update has been successfully completed. The technician may then disconnect the update device 14 from the programmable battery unit 12 and close the access point 26, which is illustrated at step 80. The battery software update process is now complete and the update device 14 is ready to update the next programmable battery unit 12.

While the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A system for updating battery software, comprising:
   a programmable battery unit that includes a programming access point;
   a battery control unit associated with said programmable battery unit;
   a first storage medium associated with said battery control unit;
   an input port associated with said battery control unit accessible via said access point;
   an update device including a second storage medium having stored therein updated battery software for said programmable battery unit;
   a connector for connecting said update device to said input port of said programmable battery unit; and
   a software module on said update device operable to automatically transmit said updated battery software from said update device to said first storage medium of said programmable battery unit once said update device detects a connection between said update device and said programmable battery unit.

2. The system of claim 1, wherein said access point is located on an outside surface of said programmable battery unit and comprises an aperture formed in said programmable battery unit.

3. The system of claim 1, wherein said access point includes a sliding door operable to expose an aperture when positioned in an open state and to cover said aperture when positioned in a closed state.

4. The system of claim 3, wherein said sliding door includes a base portion that fits within at least one track of said programmable battery unit, wherein said sliding door is operable to move back and forth within said track.

5. The system of claim 4, wherein said sliding door includes a grip that protrudes upwardly from said base section of said sliding door.

6. The system of claim 1, wherein said first storage medium comprises a non-volatile memory.

7. The system of claim 1, further comprising a computing device connected with said update device for transferring said updated battery software to said update device.

8. The system of claim 1, further comprising an indicator on said update device for indicating when a valid connection between said update device and said programmable battery unit has been made.

9. The system of claim 1, further comprising a first indicator on said update device for indicating when said software module is updating said programmable battery unit and a second indicator for indicating when said software module has completed updating said programmable battery unit.

10. A method of updating software in rechargeable batteries for use with portable electronic devices, comprising the steps of:
   providing an access point in a programmable battery unit;
   connecting an update device with an input port exposed through said access point of said programmable battery unit;

transferring updated battery software from said update device to said programmable battery unit;

generating an update in progress indication on said update device while said updated battery software is being transferred to said programmable battery unit;

storing said updated battery software in a storage medium of said programmable battery unit; and generating an update complete indication on said update device after said updated battery software has been successfully transferred to said programmable battery unit.

11. The method of claim 10, wherein said access point comprises a sliding door operable to be moved between an open state and a closed state.

12. The method of claim 10, further comprising the step of disconnecting said update device from said input port.

13. The method of claim 10, wherein said update device comprises a portable handheld unit.

14. A system for updating battery software, comprising:

a programmable battery unit that includes a programming access point;

a battery control unit associated with said programmable battery unit;

a first storage medium associated with said battery control unit;

an input port associated with said battery control unit accessible via said access point;

an portable handheld update device including a second storage medium having stored therein updated battery software for said programmable battery unit;

a connector for connecting said update device to said input port of said programmable battery unit;

a software module on said update device operable to automatically transmit said updated battery software from said update device to said first storage medium of said programmable battery unit once said update device detects a connection between said update device and said programmable battery unit;

a first indicator on said portable handheld update device configured to provide a progress indication to a user of said update device while said updated battery software is being installed on said programmable battery unit; and a second indicator on said portable handheld update device configure to provide a completion indication to said user of said update device once said update device has successfully completed installing said updated battery software on said programmable battery unit.

* * * * *